United States Patent
Tsai et al.

(10) Patent No.: US 8,739,228 B1
(45) Date of Patent: May 27, 2014

(54) VEHICLE DISPLAY SYSTEM

(71) Applicant: Jet Optoelectronics Co., Ltd., Taipei (TW)

(72) Inventors: Chia-Hsiang Tsai, Taipei (TW); Michael Tai-Hao Wen, Taipei (TW)

(73) Assignee: Jet Optoelectronics Co., Ltd., Taipei (TW)

( * ) Notice: Subject to any disclaimer, the term of this patent is extended or adjusted under 35 U.S.C. 154(b) by 0 days.

(21) Appl. No.: 14/066,690

(22) Filed: Oct. 30, 2013

Related U.S. Application Data

(63) Continuation-in-part of application No. 13/674,963, filed on Nov. 13, 2012, now Pat. No. 8,601,518.

(51) Int. Cl.
*H04N 7/18* (2006.01)

(52) U.S. Cl.
USPC ............... 725/75; 725/62; 725/78; 725/81

(58) Field of Classification Search
USPC .......................... 725/62, 75, 78, 81
See application file for complete search history.

(56) References Cited

U.S. PATENT DOCUMENTS

| | | | |
|---|---|---|---|
| 7,526,367 B2 | 4/2009 | Schofield | |
| 8,171,517 B2 * | 5/2012 | Hicks et al. | 725/62 |
| 2004/0154040 A1 | 8/2004 | Ellis | |
| 2005/0015805 A1 | 1/2005 | Iwamura | |
| 2005/0102697 A1 | 5/2005 | Vitito | |
| 2006/0288379 A1 | 12/2006 | Vitito | |
| 2008/0250462 A1 | 10/2008 | Crohas | |
| 2009/0138920 A1 | 5/2009 | Anandpura | |
| 2010/0005496 A1 | 1/2010 | Ellis | |
| 2011/0106375 A1 | 5/2011 | Gurusamy Sundaram | |
| 2011/0143835 A1 * | 6/2011 | Sizelove | 463/31 |
| 2013/0016209 A1 | 1/2013 | Taylor | |
| 2013/0151111 A1 | 6/2013 | Skelton | |
| 2013/0157647 A1 | 6/2013 | Kolodziej | |
| 2013/0200991 A1 | 8/2013 | Ricci | |
| 2013/0226369 A1 | 8/2013 | Yorio | |

* cited by examiner

*Primary Examiner* — Pankaj Kumar
*Assistant Examiner* — Charles N Hicks
(74) *Attorney, Agent, or Firm* — Gokalp Bayramoglu

(57) ABSTRACT

A vehicle entertainment system comprising media player, master unit which capable of running at least two different tasks concurrently, slave units being under control of the master unit and slave units are capable of executing at least two different actions corresponding to the at least two different tasks concurrently. A smart device that is capable of controlling the operation of master unit and slave units. A media placed in the media player can be played and shared between master and slave units. The media can be stored in a storage device to be played at a later time.

24 Claims, 6 Drawing Sheets

VEHICLE DISPLAY SYSTEM

This application is a continuation-in-part application of application Ser. No. 13/674,963 filed at United States Patent and Trademark Office on Nov. 13, 2012, which is incorporated herein by reference.

BACKGROUND

Smart devices use operating systems to control their operations. Applications developed to enable smart devices to perform different functions. These application programs run within the operating system environment. An example of operating systems in a smart device is an operating system known as Android. In a vehicle system, the driver and the passengers holding a smart device such as a smart phone or a smart tablet are able to consume the rich contents provided by these smart mobile devices. When occupants in the vehicle want to watch a DVD or play a CD, they will not be able to do it on these devices.

DVD, CD, and Blue ray discs have reached a significant amount of popularity worldwide over the past decade. These storage medias can store large amount of information, music and movies. They can be played on devices that have DVD, CD and Blue ray device slots that can accept DVD, CD or Blue ray media. Current smart devices do not have DVD, CD or Blue ray slots to accept these media to play.

Even if the system could play DVDs or CDs it still would not solve a common problem that a family faces while traveling in a vehicle. It is common for parents to ride in the front seats and for young kids to ride in the back seats. Very often a parent would want to control what children watch and listen to. In other words parents would like to moderate the contents consumed by their kids in the back. This problem is especially visible in families of large size over extended periods of travel.

SUMMARY OF THE INVENTION

The invention relates to a vehicle video system installed within a vehicle. More specifically the integration of different media contents displayed simultaneously with an operating system used in the vehicle video system.

In one embodiment a vehicle video system, comprises: a master unit for running at least two different tasks concurrently; at least two slave units being under control of the master unit and for respectively executing at least two different actions corresponding to the at least two different tasks concurrently.

DETAILED DESCRIPTION OF PREFERRED EMBODIMENTS

Figure 1:
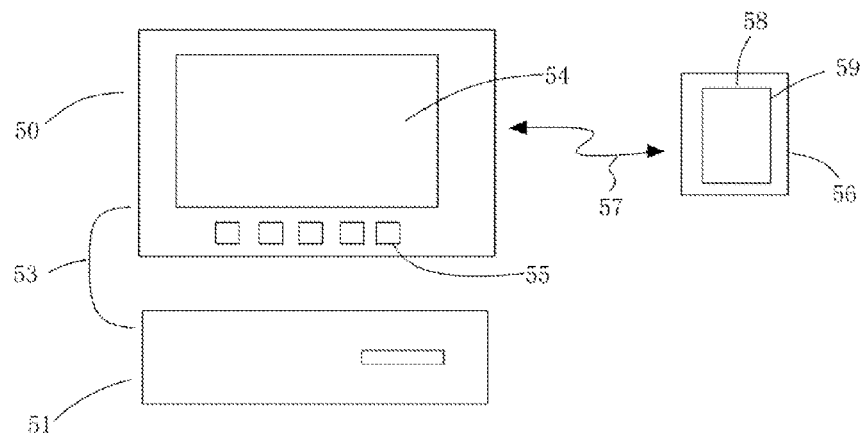
FIG. 1 shows the system configuration with a master unit, media driver and a smart unit.

An embodiment of the invention is shown in FIG. 1. Master unit 50 is a display unit or a smart device that has an operating system installed on it to perform several functions. These functions do not include playing, a DVD media or CD media or Blue Ray media. The operating system used and the operating system can be any popular operating system such as Android, iOS, Windows used by smart devices on the market. We create an algorithm and a software application based on the algorithm to interface and control the physical player. Media player 51 is a unit where it may have a DVD drive or a CD drive or a Blue Ray drive or any of the combination of these drives. Connection 53 between media drive 51 and master unit 50 connects the video signals, audio signals and control signals between the master unit 50 and the media player 51. Media player 51 can be placed in the proximity of master unit 50 or media player 51 can be placed in a remote location. If master unit 50 and media player 51 are used in a vehicle then master unit 50 and media player 51 can be either placed next to each other or they can be separated from each other. Media player 51 should be placed in a location in the vehicle such that it would be fairly easy to access to media player 51 to make it easy for users to change the media when they wish to do so.

In another embodiment of the invention media player 51 and master unit 50 are combined into one unit. When master unit 50 is combined with media player 51, connecting wire 53 is built in master unit 50. The combined unit is placed in a location within the vehicle such that users can easily access to the unit to insert a media into it or to remove media from it.

In either embodiments disclosed above, master unit 50 has display 54 to display the video signal coming from the media player 51. Master unit 50 also has a plurality of control buttons on master unit 50. A user can push buttons 55 to control the operation of master unit 50. When a user provides commands to master unit 50 by using the buttons 55, master unit 50 communicates with media player 51 via control signal lines 53. When media player 51 receives commands from master unit 50, it performs different acts based on the incoming command. If the command is a play command then media player 51 starts playing the media and sends the audio and video signals to master unit 50. Master unit 50 displays the video signal on display unit 54.

In another embodiment, display unit 54 has touch control capability and therefore a user can input commands to master unit 50 by touching display unit 54. In this case buttons 55 do not need to exist.

In another embodiment, master unit 50 and media player 51 are controlled by smart unit 56. The smart unit 56 is a device that has a program running on it and can perform many different functions. For example smart unit 56 can be a smart telephone or a smart tablet device, smart unit 56 may or may not have display 59. If smart unit 56 does not have display 59 then smart unit 56 has buttons to send commands to master nit 50. If smart unit 56 has display unit 59 then commands sent to master unit 50 can be entered on the display by using touch screen 58 that is incorporated over display 59. A user will have the option of controlling master unit 50 either by using buttons 55 or by using smart unit 56. The connection between master unit 50 and smart unit 56 is either a wired or wireless connection 57. Wireless connection 57 can be any communication channel such as Bluetooth, radio frequency connection, infrared connection, WIFI connection or any other suitable method to communicate command signals from smart unit 56. Connection between master 50 and smart unit 56 is a two way communication channel, smart unit 56 can send control signals to master unit 50 to control the operation of master unit 50 and media player 51. If smart unit 56 sends a command to master unit 50 such that the user that is using smart unit 56 wants smart unit 56 to display video, then master unit 50 sends video signals via communication channel 57 to smart unit 56. The smart unit 56. displays the video signal coming from master unit 50 on display 59 of smart unit 56. This way, smart unit 56 can send commands to master unit 50 and display video signals on display 59 of smart unit 56, smart unit 56 can either send commands only, or display video only or can do both of these control function and display function simultaneously.

Figure 2:
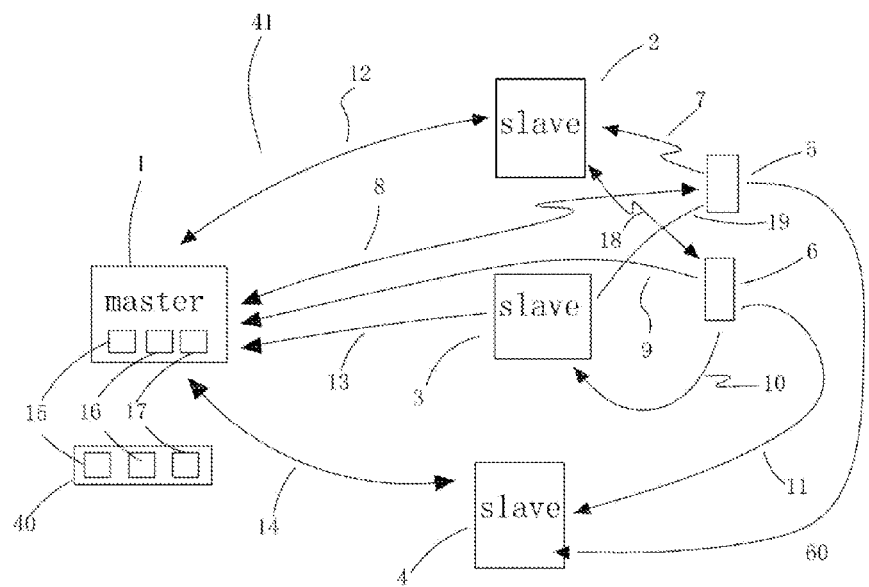
FIG. 2 shows the system configuration with a master unit, multiple slave units and multiple smart units.

FIG. 2 shows another embodiment of the invention. In this embodiment there is master unit 1 and slave units 2, 3 and 4. There are three slave units shown in FIG. 2. However the number of slave units can be either 1 or more. There is no upper limit as to the number of slave units. The system in FIG. 2 also has smart units 5 and 6. Only two smart units are shown in FIG. 2. There may be one or more smart units in the system. Master unit 1 is similar to the unit 50 in FIG. 1. System 41 also has media player 40. Media player 40 has either DVD drive, 15, CD drive 16 or Blue ray drive 17. Media player 40 can have any combination of these drives. In FIG. 2 master unit 1 and media player 40 are shown as two separate units. In another embodiment master unit 1 and media player 40 can be combined as one unit. Slave units 2, 3, and 4 have display units on them and they communicate with master unit 1 via communication links 12, 13, and 14 respectively. These communication links 12, 13, and 14 can be wireless or wired communication links. They comprise video signals, audio signals and control signals. If they are wireless links the wireless technology can be Bluetooth technology, radio frequency technology, infrared technology, WIFI connection or any other current or potential wireless technology, smart units 5 and 6 are devices with software programs running on them and they may or may not have display devices on them, smart units 5 and 6 communicate with master unit 1 via communication channel 8 and 9, smart unit 5 communicates with slave units 2, 3, and 4 via communication channels 7, 19 and 60, smart unit 6 communicates with slave units 2, 3, and 4 via communication channels 18, 10 and 11. Communication links 7, 19, 60, 18, 10 and 11 can be wireless or wired communication links. They comprise video signals, audio signals and control signals. If they are wireless links the wireless technology can be Bluetooth technology, radio frequency technology, infrared technology, WIFI connection or any other current or potential wireless technology. In this embodiment either smart unit 5 or smart unit 6 can control the operation of master unit 1 and slave units 2, 3 and 4. For example smart unit 5 can send a command to master unit 1 to play a media that is placed in media player 40. Smart unit 5 can send another command to master unit 1 directing master unit 1 to send video signal to slave unit 2. Smart unit 5 can send a command to master unit 1, asking master unit 1 to send video signal to smart unit 5. A user that is controlling smart unit 5 can watch the video on smart unit 5's display device. There are many other combinations of commands that are possible in this configuration. If smart unit 5 and smart unit 6 send conflicting commands to master unit 1, master unit 1 performs the most recent command received from any smart unit.

Figure 3:
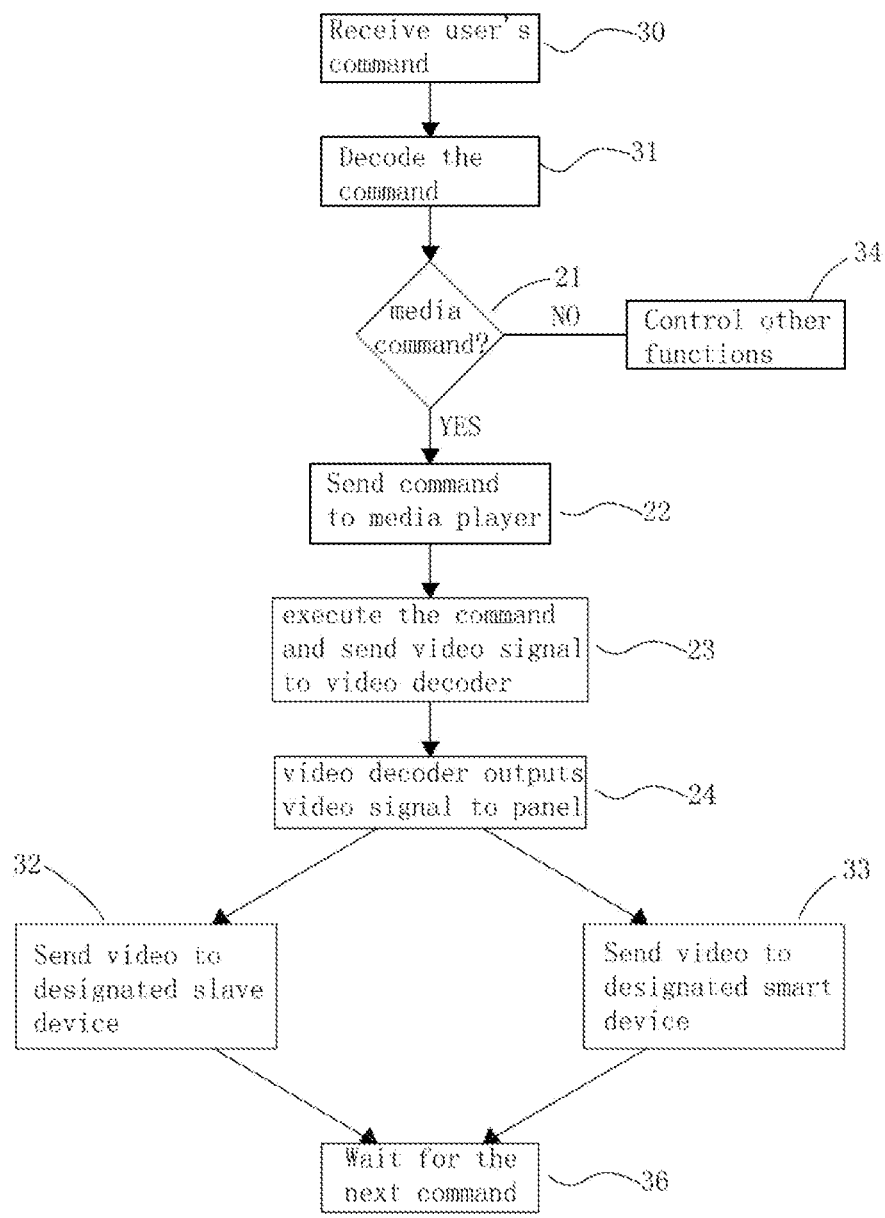
FIG. 3 shows the flow diagram of how the master unit is controlled to distribute video to slave units.

FIG. 3 shows another embodiment where a command received from smart units 5 and 6 are processed by master unit 1. In FIG. 3 in step 30, a user enters a command to smart unit 5 or 6 or to master unit 50. The command is sent to master unit 1 and evaluated by master unit 1. In step 31, the command coming from smart unit 5 or 6 or command entered to master unit 50 is decoded. If the command coming from smart unit 5 or 6 or the command entered to master unit 50 is a media player command then the command is sent to media player in step 22. If the command in step 21 is not a media player command then other function control operation is performed in step 34. In step 23, media player 40 executes the command and sends the video signal to the video decoder. In step 24, the video decoder outputs signal to the panel. In step 32 master unit 1 sends the video signal to one of slave units 2, 3 or 4 or any combination thereof. Furthermore in step 33, master unit 1 may send video signals to smart units 5 or 6 or any combination thereof. Distribution of video signal by master unit 1 depends on the command signal received from smart unit 5 or 6 or the command entered to master unit 1. In step 36, the system waits for the next command.

Figure 4:
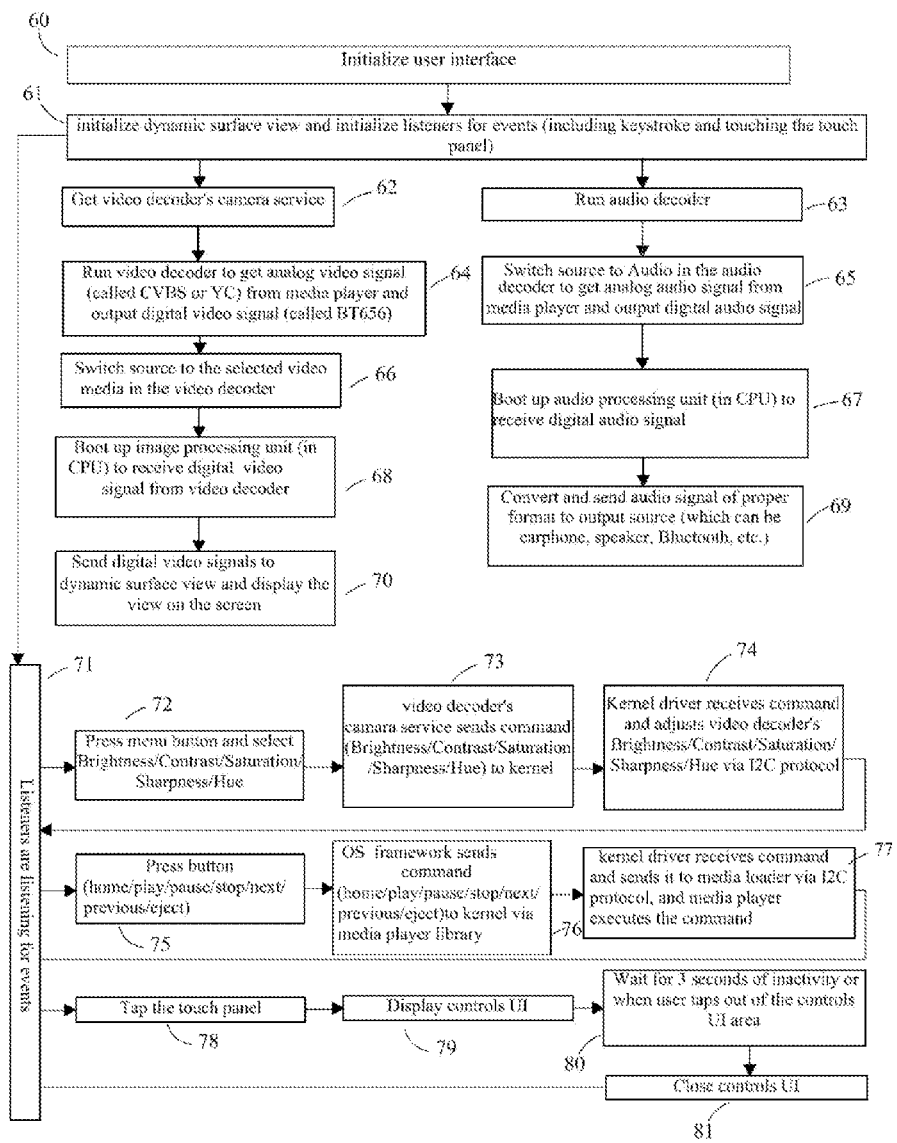
FIG. 4 shows the algorithm used to play DVD or blue ray or other video media based on the command received from the user

FIG. 4 shows the algorithm used to play DVD or blue ray or other video media based on the command received from the user. In step 60 the system initializes the user interface. In step 61, the system initializes dynamic surface view and further initializes listeners for events (misspelling in FIG. 4) including keystroke and the touch panel. In step 62 the system receives video decoder's camera service. In step 64, the video decoder gets the analog video signal from the media player. This analog video signal is called CVBS or YC. The system outputs digital video signal based on the analog video signal input. This digital video signal is called BT656. In step 66 the source is switched to the selected video media in the video decoder. In step 68 the image processing unit is booted up to receive digital video signal from the video decoder. Boot up means start. In step 70 the system sends the digital video signals to dynamic surface view and display view on the screen.

In step 63, the audio decoder is started to perform its operation. In step 65 the source is switched to audio in the audio decoder to get analog audio signal from the media player and output digital audio signal. In step 67 the audio processing unit is booted up to receive digital audio signal. Boot up means start. In step 69, system converts and sends audio signal of proper format to output source. The output source can be earphone, speaker. Bluetooth or any other suitable output device selected by user.

In step 71, listeners in the system listen for events. In step 72 user presses menu button and selects brightness, contrast, saturation, sharpness and hue. In step 73, video decoder's camera sends the command to kernel. The command is among brightness, contrast, saturation, sharpness and hue. There may be additional commands. In step 74, kernel driver receives command and adjusts video decoder's brightness, contrast, saturation, sharpness and hue depending on the selected command. This communication is sent over a line by using I2C protocol or any other suitable protocol.

In step 75, user presses either home, play, pause, stop, eject, next or previous buttons. In step 76, OS framework sends one of the home, play, pause, stop, and eject, next r previous commands to kernel via media loader library. In step 77, kernel driver receives command and sends it to media loader by using I2C protocol. The protocol can be any protocol that can transmit signal from one point to the next.

In step 78, user touches the touch panel. In step 79 the system displays commands specified in step 72 and step 75 in a user interface screen. In step 80, the system waits for an input for 3 seconds. If there is no input for 3 seconds or user taps out of the controls UI area, the controls UI disappears in step 81. If user inputs a command via the UI, the system moves to step 73 or 76 depending on the command.

Figure 5:
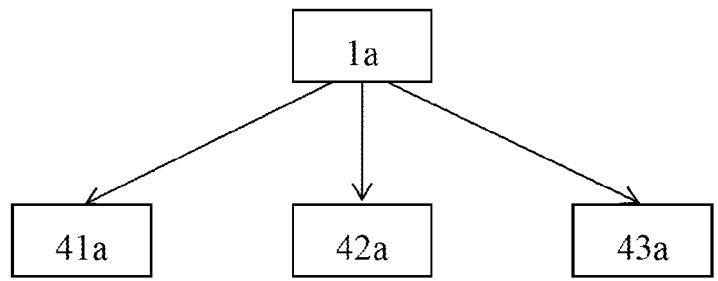
FIG. 5 shows the system configuration with a master unit, and multiple slave units illustrating another embodiment.

FIG. 5 shows another embodiment of a vehicle video system. It comprises master unit 1*a*, and slave units 41*a*, 42*a* and 43*a*. Master unit 1*a* is preferably installed in the vehicle. For example, it is an onboard computer. Master unit 1*a* is capable of running at least two different tasks concurrently. Slave units 41*a*, 42*a* and 43*a* are connected to master unit 1*a* by using wires or wirelessly. The number of slave unit can be adjusted dynamically on demand. They are under control of master unit 1*a* and for respectively executing at least two different actions corresponding to the at least two different tasks concurrently. The different tasks are playing different media contents, and the different actions are displaying the different media contents. The media contents come from a media disc such as a DVD disc or a Blu-ray disc, a game disc, a data storage device such as a USB drive or a flash drive, or from the Internet.

Certainly slave unit 41*a*, 42*a* or 43*a* are capable of displaying the same media content concurrently. They can be turned on or off and to increase or decrease the volume of the audio played on slave units 41*a*, 42*a* or 43*a* via master unit 1*a*.

The vehicle video system further comprises an application program for controlling the operation of master unit la. The application program is capable of executing at least one command at the same time so that when master unit 1*a* plays at least one media content, each of the corresponding slave unit 41*a*, 42*a* or 43*a* will display different media content simultaneously. The commands are automatically or manually sent to the application program. For example, in manual way, user may input commands to master unit 1*a* or smart unit 3*a* and then the commands are sent to the application program; in automatic way, the application program directly read information recorder 30*a*, and then executes commands upon the data from information recorder 30*a*.

Figure 6:
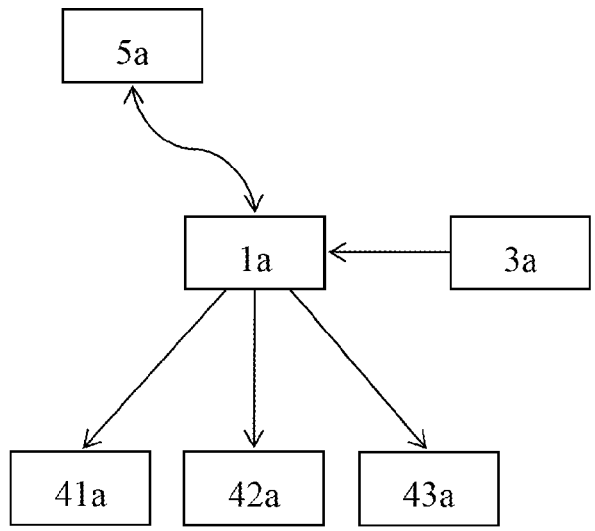
FIG. 6 shows the system configuration with a remote server, a master unit, an information recorder, and multiple slave units illustrating another embodiment.

Please refer to FIG. 6, it illustrates another embodiment of a vehicle video system. The vehicle system further comprises information recorder 3*a* and remote server 5*a* in comparison to system illustrated in FIG. 5.

Information recorder 3*a* is smart unit, an ID card, an ID key, or any device capable of storing the personal information of users and being accessed by master unit 1*a* to identify the personal information. The personal information includes but not limited to the identity, nationality, gender, educational background and interests of the user, and so on.

Remote server 5*a* is used for storing predetermined route information and relevant information about the predetermined route information, receiving identified personal information from master unit 1*a* wirelessly, and sending back the predetermined route information and the relevant information to master unit 1*a*. Moreover, remote server 5*a* may directly receive message from the Internet.

In this embodiment, slave units 41*a*, 42*a* and 43*a* are monitors, and master unit 1*a* control the monitors to display the predetermined route information and the relevant information. Such as advertisements, safety information/warning about the driving route, and information/warning about the bus as the remote server would keep track of the bus' condition and maintenance history. For example, "A turn on this road is going through road repair" or "Be Careful". As the vehicle approaches a certain spot, "You slammed on the brake yesterday at this fork of the road; do not do it again this time" would be displayed. When the next maintenance is due, "Please drive the bus to maintenance station after you finish the route today" would be displayed.

The communication between information recorder 3*a*, master unit 1*a* and slave units 41*a*, 42*a* and 43*a* is by wire or wireless. The wireless communication comprises WiFi, NFC (near field communication), RFID (radio-frequency identification), RF (radio frequency), Bluetooth. Information recorder 3*a* is WiFi-enabled, NFC-enabled, RFID-enabled, RF-enabled, or Bluetooth enabled so as to support the wireless communication.

Figure 7:
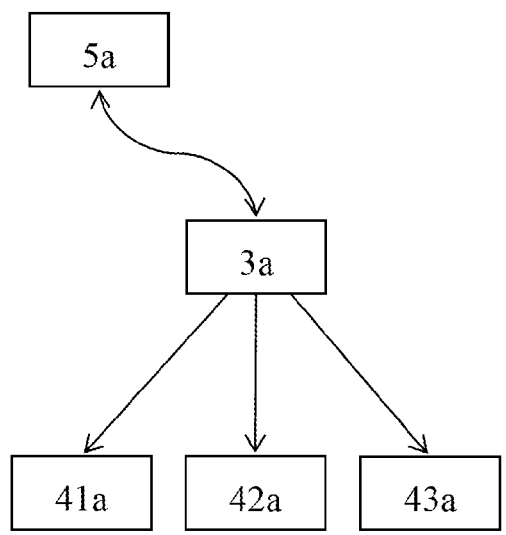
FIG. 7 shows the system configuration with a remote server, an information recorder, and multiple slave units illustrating another embodiment.

Alternatively, master unit 1*a* may not have a display screen, and information recorder 3*a* may not have a display screen, either. As illustrated in FIG. 7, information recorder 3*a* may replace master unit 1*a* and also functions as master unit 1*a*. So that remote server 5*a* may receive identified personal information from information recorder 3*a* wirelessly, and sending back the predetermined route information and the relevant information to information recorder 3*a*.

Figure 8:
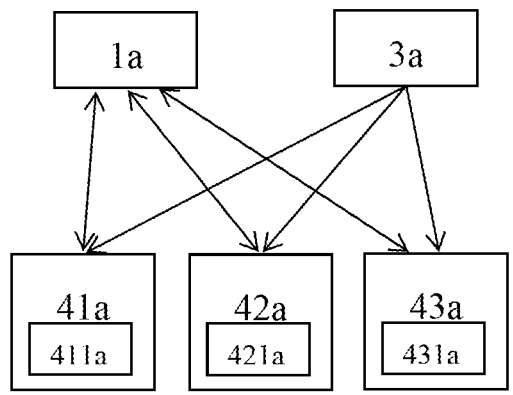
FIG. 8 shows the system configuration with a master unit, an information recorder, and multiple slave units illustrating another embodiment.

Please refer to FIG. 8, it illustrates another system comprising master unit 1*a,* information recorder 3*a*, slave units 41*a*, 42*a* and 43*a*. Each slave unit 41*a* (42*a*, 43*a*) comprises an information reader 411*a* (421*a*, 431*a*) for reading the personal information from information recorder 3*a* and sending it to master unit 1*a*. Master unit 1*a* controls slave units 41*a*, 42*a* and 43*a* to execute predetermined action according to the personal information. Slave unit 41*a*, 42*a* or 43*a* comprises a monitor for displaying predetermined video content as the predetermined action. Alternatively, slave unit 41*a*, 42*a* or 43*a* comprises an audio out for outputting predetermined audio content. For example, the audio out comprises a jack and an earphone for being plugged into the jack to output the audio content.

The system illustrated in FIG. 8 may be applied in tourism. For example, a tourist stores his information (e.g. age, nationality, gender, educational background, and more) in information recorder 3*a* (i.e. smart unit). He goes to another place and travels on a city tour bus. The city tour bus has a vehicle video system, and has three seats respectively disposed with slave units 41*a*, 42*a* and 43*a*. When the tourist gets aboard the tour bus, his seat is disposed with slave unit 41*a*. He puts smart unit 3*a* near slave unit 41*a*, then information reader 411*a* of slave unit 41*a* reads the personal information from information recorder 3*a*, slave unit 41*a* sends the personal information to master unit 1*a*. Master unit 1*a* controls slave unit 41*a* to execute predetermined action. Such as displaying predetermined video content or outputting predetermined audio content. The displaying media content should be in the tourist's language and meets the tourist's interest.

Alternatively, there may be more than one tourist. The media content on each slave unit is different according to different personal information recorded in different tourist's smart unit. The number of slave unit can be adjusted in accordance with the actual requirements.

Figure 9:
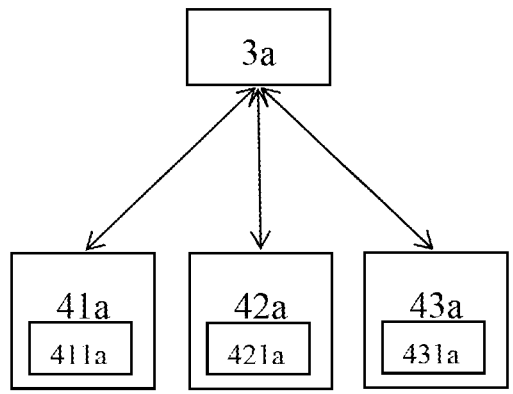
FIG. 9 shows the system configuration with an information recorder, and multiple slave units illustrating another embodiment.

Alternatively, slave unit 41a, 42a or 43a may not have a display screen. Slave unit 41a, 42a or 43a could just be electronic circuits that have an audio out and a tourist would use earphone to consume the content. As illustrated in FIG. 9, the system may not have a master unit. Information recorder 3a also has the function of master unit 1a.

Figure 10:
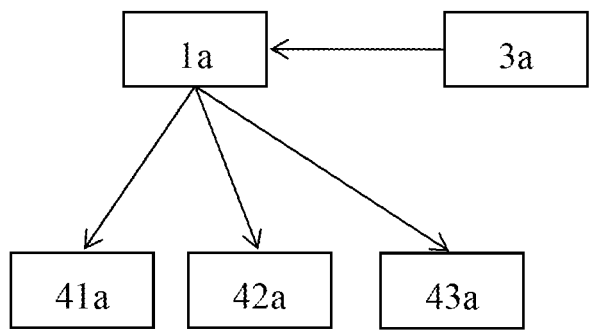
FIG. 10 shows the system configuration with a master unit, an information recorder, and multiple slave units illustrating another embodiment.

Please refer to FIG. 10, it illustrates another system comprising master unit 1a, information recorder 3a, and slave units 41a, 42a, and 43a. Master unit 1a comprises a preset configuration, and when the personal information of information recorder 3a is identified by master unit 1a, master unit 1a controls slave unit 41a, 42a or 43a or all of them to execute actions corresponding to the preset configuration. Information recorder 3a is previously configured to store a certain information in a certain location, and master unit 1a pulls the certain content from information recorder 3a and distributes the certain content to the slave units 41a, 42a or 43a. Each slave unit 41a, 42a, or 43a comprises a monitor for displaying the certain contents come from information recorder 3a, a media disc such as a DVD disc or a Blu-ray disc, a game disc, a data storage device such as a USB drive or a flash drive, or from the Internet.

Suppose the user has a van. He specifies that whenever he's in the van he wants master unit 1a to tune in to FM100.7 radio station on Mondays and to Pop Song Internet radio station on Tuesdays. Suppose the user is a parent, when he/she gets aboard the vehicle and launches the system, master unit 1a identifies the personal information of information recorder 3a, then controls slave units 41a, 42a, or 43a to display media contents according to the preset requirement, so that the kids would watch proper media content. By the way, the media contents can be adjusted on demand by inputting commands to master unit 1a. Here is an example. The mom has two children, Abby and Ben. She specifies that whenever she's in the van she wants slave unit 41a of the back left of the van to play content in /video/forAbby/folder. Slave unit 42a of the back right of the van is preset to play content in /video/forBen/folder. Slave unit 43a is preset to show an online TV channel streamed from the Internet via master unit. Further, a fourth slave unit is equipped. Then the fourth slave unit is preset to play a media content from a DVD player.

Figure 11:
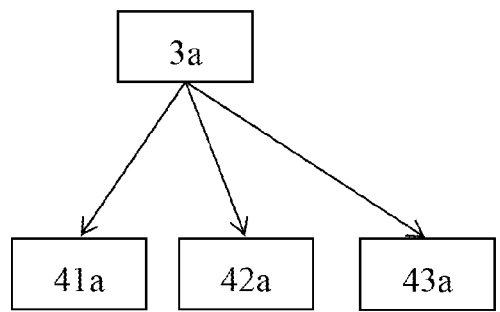
FIG. 11 shows the system configuration with an information recorder, and multiple slave units illustrating another embodiment.

Please refer to FIG. 11, information recorder 3a is capable of replacing master unit 1a, so information recorder 3a directly controls the certain contents displayed on slave unit 41a, 42a or 43a. When there is more than one person in the vehicle, different contents will be displayed on different slave units 41a, 42a and 43a.

Figure 12:
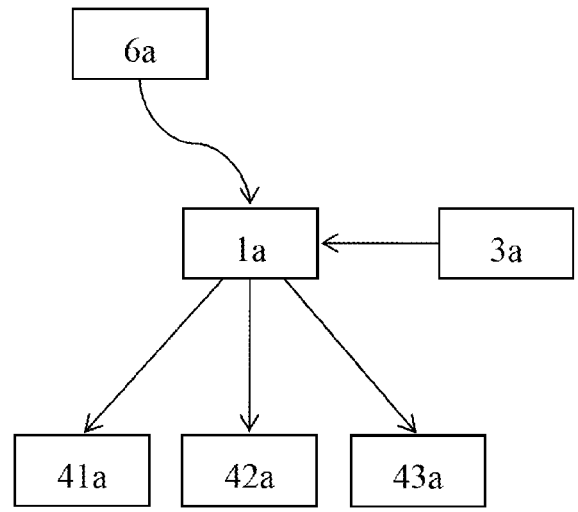
FIG. 12 shows the system configuration with a master unit, an information recorder, multiple slave units, and multiple detectors illustrating another embodiment.
Figure 13:
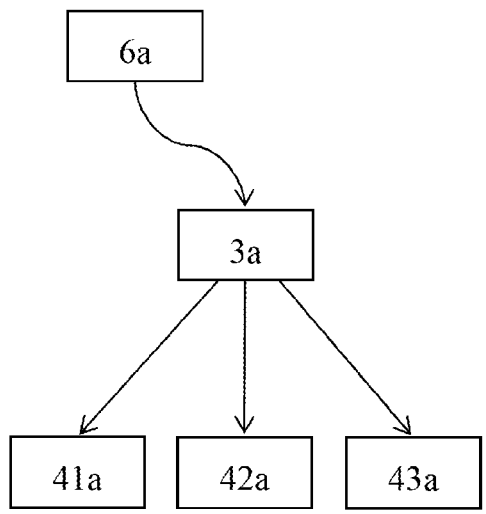
FIG. 13 shows the system configuration with an information recorder, multiple slave units, and multiple detectors illustrating another embodiment.

Please refer to FIG. 12, it illustrates a system comprising master unit 1a, information recorder 3a, slave units 41a, 42a and 43a, and a plurality of detectors 6a. Detector mentioned in this invention is a device that can detect a motion and convert motion or still images to electrical signals and communicates with a processing unit. For example, detectors 6a is applied for detecting current status of the vehicle and sending status information to master unit 1a for viewing and storing. The status information may comprise vehicle status, road status, road sign and weather information, and so on. They are connected to master unit 1a by using wires or wirelessly. The detectors 6a are cameras, which are respectively disposed on the front side, rear side, right side and left side of the vehicle. The detectors 6a can also be sensors, including but not limited to ambient temperature sensor, ambient light sensor, wheel speed sensor, engine coolant temperature sensor, blind spot monitor, tire pressure monitoring system, microphone. Detectors can also be a vehicle computer. Accordingly, status information is the type of information each detector is made to produce. For example ambient temperature sensor would produce the ambient temperature in Celsius or in Fahrenheit. The wheel speed sensor would produce the current vehicle speed in miles or kilometers. The microphone would produce audio feeds. The car computer would produce error codes that indicate some type of error according to the OBD (On-board diagnostics) specifications. The camera would produce video feeds. Master unit 1a can identify the personal information in information recorder 3a. Master unit 1a or information recorder 3a is authorized to capture the status information for viewing and storing. Master unit 1a and information recorder 3a are capable of sending the status information to the slave units 41a, 42a and 43a for viewing and storing by wire or wireless. Alternatively, slave units 41a, 42a and 43a may also be disposed outside of the vehicle. They are connected to master unit 1a and smart unit 3a wirelessly. As illustrated in FIG. 13, information recorder 30 is capable of replacing master unit 1a and also functioning as master unit 1a.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. An automobile video system of a vehicle, comprising: a master unit located in the automobile for running at least two different tasks concurrently; an information recorder located in the automobile for storing the personal information of users and being accessed by the master unit to identify the personal information; the information recorder is selected from a group consisting of a smart unit, an ID card, and an ID key;

at least two slave units located in the automobile being under control of the master unit, wherein one slave unit executing one action and therefore playing a content while another slave unit is executing another action and therefore playing another content when at least two slave units are present in the vehicle video system; wherein at least two different tasks play different media contents and the different actions display the different media contents.

2. The automobile video system of claim 1 wherein the communication between the information recorder and the master unit is by wire or wireless, and the wireless communication comprises Wi-Fi, NFC, RFID, RF, and Bluetooth.

3. The automobile system of claim 2, further comprises a remote server; wherein the remote server is capable of storing a predetermined route information and a relevant information about the predetermined route information, receiving an identified personal information from the master unit, and sending back the predetermined route information and the relevant information to the master unit.

4. The automobile video system of claim 3, wherein the at least two slave units are monitors, and the master unit controls the monitors to display the predetermined route information and the relevant information.

5. The automobile video system of claim 2 wherein each slave unit comprises an information reader for reading the personal information from the information recorder and sending it to the master unit.

6. The automobile video system of claim 5 wherein the master unit controls the slave unit to execute predetermined action according to the personal information.

7. The automobile video system of claim 6 wherein the slave unit comprises a monitor for displaying predetermined video content as the predetermined action.

8. The automobile video system of claim 6 wherein the slave unit comprises an audio out for outputting predetermined audio content, and the audio out comprises a jack and an earphone for being plugged into the jack to output the audio content.

9. The automobile video system of claim 2, wherein the master unit comprises a preset configuration; wherein when the personal information of the information recorder is identified by the master unit, the master unit controls the slave units to execute actions corresponding to the preset configuration.

10. The automobile video system of claim 9, wherein each slave unit comprises a monitor; wherein the action of the monitor is displaying certain content and the certain contents come from the information recorder, a media disc, a game disc, a data storage device, or from the Internet.

11. The automobile video system of claim 10, wherein the information recorder is previously configured to store the certain contents in a certain location, and the master unit pulls the certain content from the information recorder and distribute the certain content to the slave units.

12. The automobile video system of claim 2, further comprising at least one detector for detecting current status of the automobile and sending status information to the master unit for viewing and storing.

13. The automobile video system of claim 12, wherein when the personal information is received by the master unit from the information recorder and identified by the master unit, either the master unit or the information recorder is authorized to capture the status information for viewing and storing.

14. The automobile video system of claim 13, wherein the master unit and the information recorder are capable of sending the status information to the slave units for viewing and storing by wire or wireless.

15. The automobile video system of claim 14, wherein the detector is camera, sensor, or automobile computer; and the type of camera comprising front camera, side cameras and rear view camera.

16. The automobile video system of claim 15, wherein the slave units are disposed outside of the automobile.

17. An operating method of an automobile video system comprising: a master unit; an information recorder; and at least two slave units;
the operating method comprising the steps in the following order: running at least two different tasks concurrently via the master unit; and executing at least two different actions corresponding to the at least two different tasks respectively via the at least two slave units.

18. The operating method of the automobile video system of claim 17, further comprising: controlling the operation of the master unit via the application program.

19. An operating method of an automobile video system comprising: a master unit located in the automobile for running at least two different tasks concurrently, an information recorder located in the automobile for storing the personal information of users and being accessed by the master unit to identify the personal information, the information recorder is selected from a group consisting of a smart unit, an ID card, and an ID key; at least two slave units being under control of the master unit, wherein one slave unit executing one action and therefore playing a content while another slave unit is executing another action and therefore playing another content when at least two slave units are present in the vehicle video system; wherein at least two different tasks play different media contents and the different actions display the different media contents;
a remote server;
wherein the remote server is capable of storing a predetermined route information and relevant information about the predetermined route information, receiving an identified personal information from the master unit, and sending back the predetermined route information and the relevant information to the master unit;
wherein the communication between the information recorder and the master unit is by wire or wireless, and the wireless communication comprises WI-FI, RFID, RF, and Bluetooth;
the operating method comprising the steps in the following order: accessing the personal information in the information recorder; identifying the personal information via the master unit; receiving identified personal information from the master unit and sending back the predetermined route information and the relevant information to the master unit; displaying the information or relevant information on the monitors.

20. An operating method of an automobile video system comprising: a master unit located in the automobile for running at least two different tasks concurrently; an information recorder located in the automobile for storing the personal information of users and being accessed by the master unit to identify the personal information; the information recorder is selected from a group consisting of a smart unit, an ID card, and an ID key;
at least two slave units located in the automobile being under control of the master unit, wherein one slave unit executing one action and therefore playing a content while another slave unit is executing another action and therefore playing another content when at least two slave units are present in the vehicle video system;
wherein at least two different tasks play different media contents and the different actions display the different media contents;
wherein the communication between the information recorder and the master unit is by wire or wireless, and the wireless communication comprises WI-FI, NFC, RFID, RF, and Bluetooth;
wherein each slave unit comprises information recorder for reading the personal information from the information recorder and sending it to the master unit;
wherein the master unit controls the slave unit to execute predetermined action according to the personal information;
wherein the slave unit comprises an audio out for outputting predetermined audio content and the audio out comprises a jack and an earphone for being plugged into the jack to output the audio content;
the operating method comprising the steps in the following order: reading the personal information from the information recorder and sending it to the master unit via the slave unit; controlling the slave unit to execute predetermined action via the master unit; displaying predetermined video content or outputting predetermined audio content.

21. An operating method of an automobile video system comprising: a master unit located in the automobile for running at least two different tasks concurrently;

an information recorder located in the automobile for storing the personal information of users and being accessed by the master unit to identify the personal information;

the information recorder is selected from a group consisting of a smart unit, an ID card, and an ID key;

at least two slave units located in the automobile being under control of the master unit, wherein one slave unit executing one action and therefore playing a content while another slave unit is executing another action and therefore playing another content when at least two slave units are present in the vehicle video system;

wherein at least two different tasks play different media contents and the different actions display the different media contents;

wherein the communication between the information recorder and the master unit is by wire or wireless, and the wireless communication comprises WI-FI, NFC, RFID, RF, and Bluetooth;

wherein the master unit comprises a preset configuration;

wherein when the personal information of the information recorder is identified by the master unit, the master unit controls the slave units to execute actions corresponding to the preset configuration;

wherein each slave unit comprises a monitor; wherein the action of the monitor is displaying certain content and the certain contents come from the information recorder, a media disc, a game disc, a data storage device, or from the Internet;

wherein the information recorder is previously configured to store the certain contents in a certain location, and the master unit pulls the certain content from the information recorder and distribute the certain content to the slave units;

the operating method comprising the steps in the following order: identifying the personal information of the information recorder via the master unit; controlling the slave units to display certain contents.

22. The operating method claim 21, comprising:

configuring the certain contents in the certain location of the information recorder;

pulling the certain content from the information recorder and distributing the certain content to the slave units via the master unit.

23. An operating method of an automobile video system comprising: a master unit located in the automobile for running at least two different tasks concurrently;

an information recorder located in the automobile for storing the personal information of users and being accessed by the master unit to identify the personal information;

the information recorder is selected from a group consisting of a smart unit, an ID card, and an ID key;

at least two slave units located in the automobile being under control of the master unit, wherein one slave unit executing one action and therefore playing a content while another slave unit is executing another action and therefore playing another content wherein at least two slave units are present in the vehicle video system;

wherein at least two different tasks play different media contents and the different actions display the different media contents;

wherein the communication between the information recorder and the master unit is by wire or wireless, and the wireless communication comprises WI-FI, NFC, RFID, RF, and Bluetooth;

further comprising at least one detector for detecting current status of the automobile and sending status information to the master unit for viewing and storing;

wherein when the personal information is identified by the master unit, the master unit or the information recorder is authorized to capture the status information for viewing and storing;

wherein the master unit and the information recorder are capable of sending the status information to the slave units for viewing and storing by wire or wireless;

wherein the detector is camera, sensor, or automobile computer, and the types of camera comprise from camera, side cameras, and rear view camera; wherein the slave units are disposed outside of the automobile;

the operating method comprising the steps in the following order: detecting current status of automobile and sending current status information to the master unit; sending personal information from the information recorder to the master unit;

identifying the personal information of the information recorder via the master unit; sending the status information to the slave units via the master unit and the information recorder; storing or displaying status information on the slave units.

24. A method of displaying video signal on an automobile video system comprising a master unit; at least one slave unit directly connected to the master unit;

and at least one smart unit; the method comprising the steps in the following order:

receiving command from the smart unit; decoding the command; sending video to the slave unit and the smart unit depending upon the command; controlling different functions including volume; and waiting for the next command;

initializing user interface; initializing dynamic surface view and initializing listeners for events; getting video decoder's camera service; running video decoder to get analog video signal from media player and outputting a digital video signal; switching source to the selected video media in the video decoder;

booting up an image processing unit to receive digital video signal from video decoder; sending digital video signal to dynamic surface view and display the view on the screen; running audio decoder; switching source to audio in the audio decoder to get analog audio signal from media player; outputting digital audio signal; booting up audio processing unit to receive digital audio signal; and converting and sending audio signal of proper format to an output source; receiving a user's command either from a button or from a touch panel; sending the user's command to kernel driver; adjusting the video decoder based on the user's command wherein the user's command can be selected from a group consisting of brightness, contrast, saturation, sharpness and hue; and executing the user's command wherein the user's command can be selected from a group consisting of home, play, pause, stop, eject, next and previous.

* * * * *